Patented Aug. 17, 1943

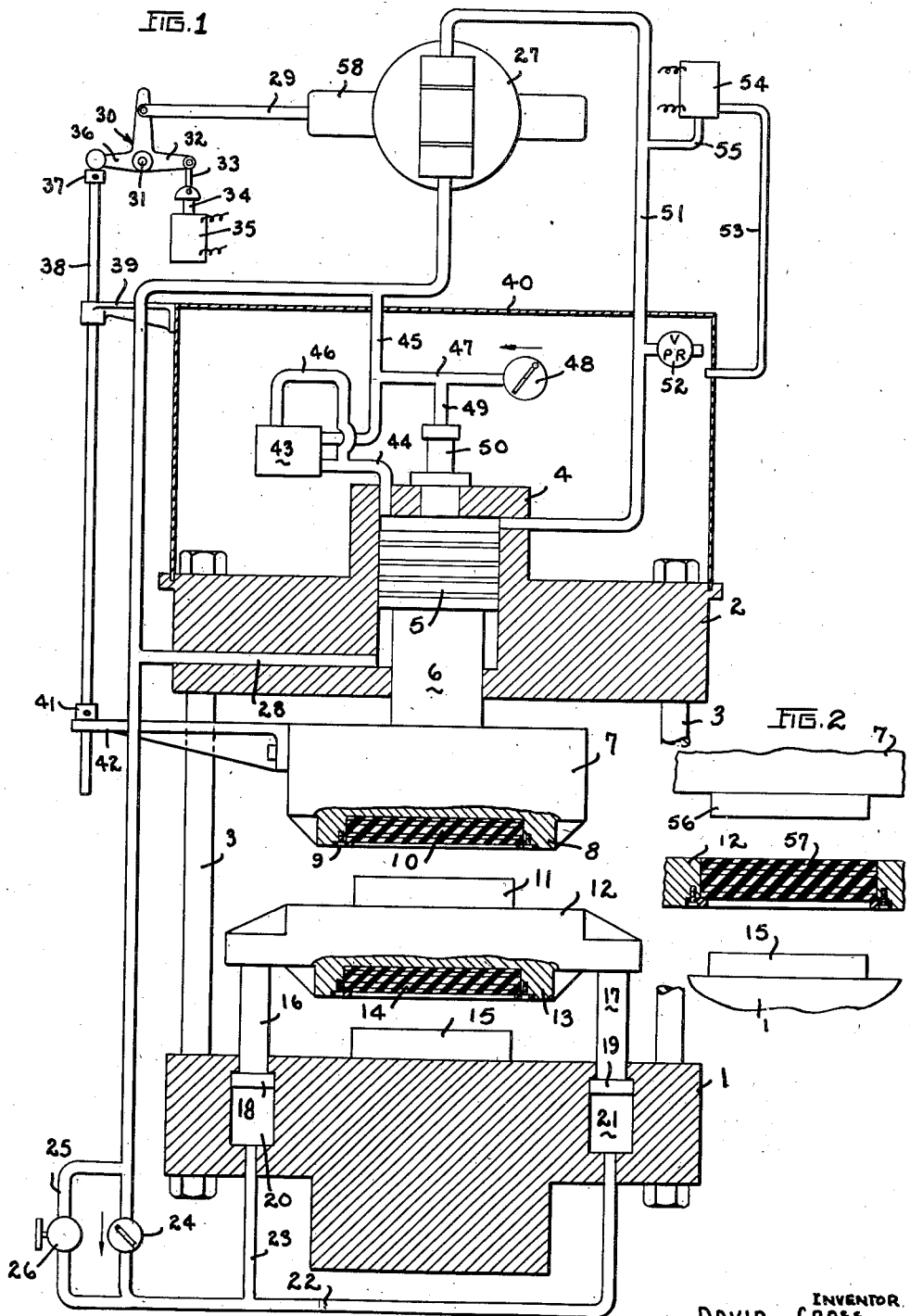

2,327,177

UNITED STATES PATENT OFFICE 2,327,177

DEVICE FOR SHAPING SHEET METAL

David Cross, Mount Gilead, Ohio, assignor to The Hydraulic Development Corporation, Inc., Wilmington, Del., a corporation of Delaware Application May 7, 1941, Serial No. 392,323

6 Claims. (Cl. 113—44)

This invention relates to metal working and, especially, to a device for shaping sheet metal.

More particularly, the invention relates to improvements in the so-called Guerin process. Fundamentally, the Guerin process is the use of simple and inexpensive die blocks, a rubber pad and a hydraulic press platen for cutting and shaping sheet metal. In this process the rubber pad acts as a pressing medium to transmit force exerted by the press to the surface of the sheet metal, which is placed between the head and the die blocks.

To carry out the Guerin process, the rubber pad is fastened within a container, and the container is mounted to the moving platen of the press. This container serves to restrain the pad on all sides except the working surface. The bolster plate is fastened to the bed of the press and serves to support the die blocks.

To manufacture or shape a plurality of work pieces during one and the same cycle of the press, heretofore a corresponding number of rubber dies or pads were connected to the press platen in side by side arrangement, while a corresponding number of metal dies were mounted in side by side arrangement on the press bed. However, with these presses, the press platen increases in size with the increasing number of work pieces simultaneously to be shaped. Aside from the fact that this complicates the loading of the press, the size of the press platen cannot be increased beyond certain limits, if a tilting movement of the platen, which harmfully affects the accurateness of the work piece, is to be avoided during the shaping operation.

Accordingly, it is an object of the invention to provide an improvement of the above mentioned shaping process, which will enable an increase in the number of work pieces which may simultaneously be shaped without endangering the accurateness or neatness thereof.

It is another object to provide a press for operation in connection with rubber dies or pads, which will make it possible to increase the output in finished work pieces per cycle over similar presses heretofore used without enlarging the press platen.

A further object of the invention consists in the provision of a press in which an auxiliary die supporting member is arranged between the press platen and the press bed.

A still further object consists in the provision of a press in which the die or dies connected to the press platen cooperates or cooperate with a movably arranged supporting member carrying dies on opposite sides thereof and operating with a stationary die.

It is another object of the invention to provide a press as set forth in the preceding paragraph, in which the movably arranged supporting member carries at least one metal die on one side thereof and at least one rubber pad or rubber die on the opposite side thereof.

A still further object of the invention consists in the provision of a press having a platen for receiving a metal die and a press bed for receiving a second metal die, while a double acting rubber die or rubber pad is movably mounted between said metal dies for cooperation therewith.

These and other objects and advantages of the invention will appear more clearly from the following specification in connection with the accompanying drawing, in which:

Figure 1 is a diagrammatic illustration of a press according to the invention, and Figure 2 shows a modification over the structure of Figure 1.

General arrangement

The press according to the present invention comprises substantially a hydraulically reciprocable press platen having attached thereto a die for cooperation with a movably arranged double acting die member, one side of which is adapted to effect a shaping operation with the die connected to the platen, while the other side of the double acting die member cooperates with a stationary die on the press bed.

According to a first embodiment of the invention, the double acting die member comprises a metal die portion on one side thereof and a rubber pad or die portion on the other side thereof.

According to a second embodiment of the invention, the double acting die member merely consists of a rubber pad, one side of which cooperates with a metal die connected to the platen, while the other side is arranged for cooperation with a metal die connected to the press bed.

Structural arrangement

The press diagrammatically illustrated in Figure 1 comprises substantially a press bed 1 and a press head 2 connected with each other by means of strain rods 3.

The press head comprises a press cylinder 4 having reciprocably mounted therein a double acting press piston 5 connected by means of piston rod 6 with the press platen 7. Connected to the press platen 7 by any convenient means is a container or casing 8 having fastened thereto, for instance by means of a ring 9, a rubber pad or die 10. This container serves to restrain the pad on all sides except the working surface.

Cooperating with the rubber pad 10 is a metal die 11 mounted on a supporting member 12, the lower side of which has connected thereto a container or casing 13, similar to the container 8, and housing a rubber pad 14 for cooperation with a metal die 15 stationarily mounted on the bed 1.

The supporting member 12 is supported by plungers 16, 17 respectively connected to pistons 18, 19 movable in cylinders 20, 21 provided in the press bed 1. A conduit 22 communicates with the cylinder 21, and a conduit 23 branching off the conduit 22 leads to the cylinder 20. The conduit 22 comprises a check valve 24 adapted to be by-passed by a conduit 25 having an adjustable choke valve 26 therein. The conduit 22 leads to one side of a variable delivery pump 27, the other side of which communicates through a conduit 51 with the upper portion of the press cylinder 4 and with a pressure relief valve 52. The lower portion of the press cylinder 4 communicates through a conduit 28 with the conduit 22.

The variable delivery pump 27 may be of any desired type, for instance of the type disclosed in U. S. Patent No. 2,184,665 to Ernst. The delivery of this pump is controlled by a control valve member 29, pivotally connected with a three arm lever, generally designated 30 and pivotally supported by the pivot 31. The arm 32 of the three arm lever 30 is connected by a link 33 with the armature 34 of a solenoid 35 adapted, when energized, to attract the armature 34 so as to cause the three arm lever 30 to shift about pivot 31 in clockwise direction. The arm 36 of the three arm lever 30 is provided for cooperation with a collar 37 adjustably mounted on a push rod 38, which is guided in an arm 39 connected to a surge tank or fluid reservoir 40 mounted on top of the press head 2. Adjustably mounted on the push rod 38, adjacent the lower end thereof, is a collar 41 adapted to be engaged by the arm 42 connected to the platen 7.

The surge tank 40 houses a main cylinder release and pump by-pass valve 43 connected by means of conduit 44 with the upper portion of the press cylinder 4, and by means of conduit 45 with the conduit 22. The valve 43 has also connected thereto a conduit 46 leading into the conduit 44. Branching off the conduit 44 is a conduit 47 having connected thereto a check valve 48 and communicating through conduit 49 with the upper portion of a surge valve 50. The surge valve 50 and main cylinder release and pump by-pass valve 43 do not form a part of the present invention and for a more detailed description thereof reference may respectively be had to U. S. Patent 2,193,248 to Ernst and U. S. patent application No. 286,063, filed July 24, 1939, now Patent No. 2,268,205.

The surge valve 50 serves primarily for prefilling the press cylinder 4, while the press piston 5, during the first portion of its downward stroke, slides downwardly by gravity. The purpose of the main cylinder release and pump by-pass valve 43 consists in releasing the pressure in the upper portion of the press cylinder 4 at the initiation of the retraction stroke of the press platen.

Also communicating with the surge tank 40 is a conduit 53 leading to a tonnage control valve 54 which in its turn communicates through conduit 55 with the conduit 51. The tonnage control valve 54 may be of any desired type, for instance the type disclosed in U. S. Patent No. 2,224,957 to Ernst. This tonnage control valve 54 is adapted in response to a predetermined pressure in the conduit 51, to break the energizing circuit for the solenoid 35.

According to the second embodiment of the invention, the rubber pad 10 of Figure 1 is replaced by a metal die 56, while a double acting rubber pad 57 is substituted for the metal die 11 and the rubber pad 14 of Figure 1. Otherwise, the structure associated with the dies may be the same as that shown in Figure 1.

*Operation*

Assuming that all parts of the press occupy the position shown in Figure 1 and that it is desired to perform a working cycle, the operator first places one work piece on the die 11 and another work piece on the die 15. Then the pump 27 is started and the energizing circuit for the solenoid 35 is closed in any convenient manner.

Energization of the solenoid 35 causes downward movement of the armature 34 which in its turn, by means of the lever arm 32, causes the valve member 29, pertaining to the pump 27, to move toward the right, thereby shifting the pump 27 into full delivery forward stroke position. As a result thereof, conduit 22 becomes the suction line of the pump, which now withdraws fluid from the lower portion of the press cylinder 4 through conduit 28 so that the piston 5 and the platen 7 slide downwardly as fast as fluid is withdrawn from below the piston 5. Fluid through the line 51 is supplied by the pump 27 to the upper portion of the press cylinder 4, and supplemented by the fluid passing from the tank 40 through the check valve 48 and the surge valve 50.

Since the suction line 22 also communicates with the auxiliary cylinders 20 and 21, fluid from said auxiliary cylinder is expelled by the respective pistons 18 and 19, moved downwardly by the weight of the supporting member 12, and escapes through choke valve 26 and conduit 25 to the suction side of the pump. When, during this downward movement of the supporting member 12, the pad 14 engages the die 15, the supporting member 12 comes temporarily to a halt. In the meantime the platen 7 has moved downwardly so that the pad 10 engages the die 11, thereby also coming to a temporary halt.

Pressure now builds up in the press cylinder 4 so as to close the surge valve 50 and further building up of pressure in the press cylinder 4 causes the piston 5 and platen 7 to start the actual pressing or shaping operation. The rubber pads 10 and 14 now, due to the pressure acting thereupon, gradually conform to the shape of the dies 11 and 15, thereby shaping the respective work pieces into the desired form. When, at the end of this shaping operation, a predetermined pressure has developed in the upper portion of the press cylinder 4 and, thereby, also in the conduit 51, this pressure acts, through conduit 55 on the tonnage control valve 54 so as to cause the latter to break the energizing circuit for the solenoid 35. As a result thereof a spring (not shown) provided in the servomotor 58, pertaining to the pump 27, pushes the valve rod 29 outwardly, thereby shifting the pump to full delivery retraction stroke position. The conduit 51 then becomes the suction line and the conduit 22 becomes the pressure line of the pump 27. Consequently, pressure fluid is supplied through conduit 22 into the lower portion of the press cylinder 4 and also into the auxiliary cylinders 20 and 21, thereby starting the upward stroke of the platen 7 and the supporting member 12. When the pistons 18 and 19 abut the upper end of the auxiliary cylinders 20 and 21, the supporting member 12 comes to a halt, while the platen 7 continues its upward movement.

As soon as the dies 11 and 15 are respectively spaced from the pads 10 and 14, the work pieces are removed and replaced by new work pieces.

When the platen 7 approaches the end of its retraction stroke, the platen arm 42 engages the collar 41 on the push rod 38 and, thereby, lifts the push rod 38 so that its collar 37 engages the lever arm 36 and shifts the latter in clockwise direction to such an extent that the valve member 29 shifts the pump 27 to substantially no delivery or neutral position. The press then comes to a halt and is ready for a new cycle.

With regard to the embodiment of Figure 2, the operation of the press is the same as that just described, the only difference being that, in this instance, during the shaping operation the upper portion of the rubber pad 57 gradually conforms to the metal die 56, whereas the lower portion of the rubber pad 57 conforms to the shape of the metal die 15.

It is, of course, understood that while the press illustrated in Figure 1 merely shows one die on platen 7 and one die on the bed 1, also a plurality of dies may be arranged side by side on the platen 7 and the bed 1, in which instance the die on the supporting member 12 or the number of the rubber pads 57 will correspond to the number of dies on the platen and bed.

It will be understood that I desire to comprehend within my invention such modifications as come within the scope of the claims and the invention.

Having thus fully described my invention, what I claim as new and desire to secure by Letters Patent is:

1. In combination in a press, a press head, a press platen reciprocably mounted in said head, a first body of resilient flowable material supported by said platen, a press bed, a first metal die supported by said bed, a die supporting member movably arranged between said head and said bed, a second metal die mounted on said supporting member for cooperation with said first body, a second body of flowable material supported by said supporting member for cooperation with said metal die on said press bed, and fluid operable means for spacing said die supporting member from said platen and said bed.

2. In combination in a press, a press head, a press platen reciprocably mounted in said head for receiving a first die, a press bed adapted to receive a second die, and a rubber pad interposed between said platen and said bed and movable selectively toward said bed and said head or away therefrom.

3. In combination in a press, a press head, a press platen reciprocably mounted in said head for receiving a first die pad of resilient flowable material, a press bed adapted to receive a first die, a supporting member interposed between said bed and said head and having means for receiving a second die on one side of said supporting member for cooperation with said first die pad and for receiving a second die pad of resilient flowable material on the opposite side of said supporting member for cooperation with said second die, and fluid operable plunger means connected to said supporting member for selectively moving the same toward or away from said platen and said bed.

4. In combination in a press, a press head, a pressing member reciprocably mounted in said head, a press bed, fluid operable motor means for reciprocating said pressing member, a die mounted on said bed, a reciprocable double acting die element for cooperation with said pressing member and said die and having at least one of its sides provided with a die pad of resilient flowable material, and fluid operable plunger means hydraulically connected with said motor means and operatively connected with said double-acting die element for actuating the same.

5. In combination in a press, a press head, a pressing member reciprocably mounted in said head, a press bed, a die mounted on said bed, a double acting die element having at least one side thereof provided with a die pad of resilient flowable material for engagement with said die and being adapted to bring its opposite side into engagement with said pressing member, fluid operable motor means for reciprocating said pressing member, plunger means hydraulically connected with said motor means for actuating said double-acting die element, and means associated with said plunger means for controlling the movement of said double-acting die element toward said bed.

6. In combination in a press, a pair of male dies, a yielding female member interposed between said dies for ccooperation with each of said dies, and means for effecting relative movement of said dies and said member for causing said dies in cooperation with said member simultaneously to shape metal sheets interposed between said dies and said member.

DAVID CROSS.